(12) United States Patent  
Schaeper et al.

(10) Patent No.: US 11,142,245 B2
(45) Date of Patent: Oct. 12, 2021

(54) METHOD FOR DETECTING AND/OR CONTROLLING A COUPLING PROCESS BETWEEN A TOWING VEHICLE AND A VEHICLE TRAILER

(71) Applicant: WABCO Europe BVBA, Brussels (BE)

(72) Inventors: Finn Schaeper, Hannover (DE); Thomas Wolf, Barsinghausen (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 339 days.

(21) Appl. No.: 16/334,360

(22) PCT Filed: Sep. 5, 2017

(86) PCT No.: PCT/EP2017/001048
§ 371 (c)(1),
(2) Date: Mar. 19, 2019

(87) PCT Pub. No.: WO2018/054525
PCT Pub. Date: Mar. 29, 2018

(65) Prior Publication Data
US 2019/0241215 A1 Aug. 8, 2019

(30) Foreign Application Priority Data

Sep. 21, 2016 (DE) ...................... 10 2016 011 323.5

(51) Int. Cl.
*B62D 13/06* (2006.01)
*B62D 53/12* (2006.01)
(Continued)

(52) U.S. Cl.
CPC ......... *B62D 13/06* (2013.01); *B60G 17/0155* (2013.01); *B60W 30/08* (2013.01);
(Continued)

(58) Field of Classification Search
CPC .... B62D 13/06; B62D 15/0285; B62D 53/08; B62D 53/12; B60G 17/0155; B60G 2500/30; B60W 30/08; G05D 1/0011
See application file for complete search history.

(56) References Cited

U.S. PATENT DOCUMENTS 7,429,051 B2 9/2008 Bauer et al.
2006/0261572 A1* 11/2006 Biondi ................. B62D 13/025
280/432

(Continued)

FOREIGN PATENT DOCUMENTS

DE 102006057610 A1 4/2008
DE 102014110498 A1 * 1/2016 ............... B60D 1/62
(Continued)

*Primary Examiner* — Hunter B Lonsberry
*Assistant Examiner* — Elizabeth Yang
(74) *Attorney, Agent, or Firm* — Leydig, Voit & Mayer, Ltd.

(57) ABSTRACT

A method for identifying and/or controlling a coupling procedure between a towing vehicle and a vehicle trailer that is embodied as a semi-trailer includes determining a contact between the coupling plate of the towing vehicle and the fifth wheel plate of the semi-trailer by way of a change of an adjusting speed with which a distance between the at least one rear axle of the towing vehicle and the locking device of the coupling plate is increased. The towing vehicle comprises a coupling plate and the semi-trailer comprises a fifth wheel plate having a king pin that is fixed in the coupled state in a locking device of the coupling plate and the towing vehicle comprises a pneumatic level controlling device by way of which it is possible to set different distances between at least one rear axle of the towing vehicle and the locking device of the coupling plate.

19 Claims, 3 Drawing Sheets

(51) Int. Cl.
  *B60W 30/08* (2012.01)
  *B62D 53/08* (2006.01)
  *B60G 17/015* (2006.01)
  *B62D 15/02* (2006.01)
  *G05D 1/00* (2006.01)

(52) U.S. Cl.
  CPC ......... *B62D 15/0285* (2013.01); *B62D 53/08* (2013.01); *B62D 53/12* (2013.01); *G05D 1/0011* (2013.01); *B60G 2500/30* (2013.01)

(56) References Cited

U.S. PATENT DOCUMENTS

2006/0293800 A1* 12/2006 Bauer .................... B60D 1/465
  701/1
2017/0313351 A1* 11/2017 Lavoie .................. B62D 13/06

FOREIGN PATENT DOCUMENTS

| | | | |
|---|---|---|---|
| DE | 102014110498 A1 | 1/2016 | |
| DE | 112007000554 B4 * | 1/2016 | ............. B62D 53/08 |
| EP | 1740400 A1 | 1/2007 | |
| EP | 1874616 A1 | 1/2008 | |
| EP | 1874616 B1 * | 6/2009 | ............. B62D 53/12 |
| WO | WO 2005080100 A | 9/2005 | |
| WO | WO 2005108194 A1 | 11/2005 | |
| WO | WO 2006114197 A1 | 11/2006 | |
| WO | WO-2007102777 A1 * | 9/2007 | ......... B60G 17/0275 |
| WO | WO 2007102777 A1 | 9/2007 | |

* cited by examiner

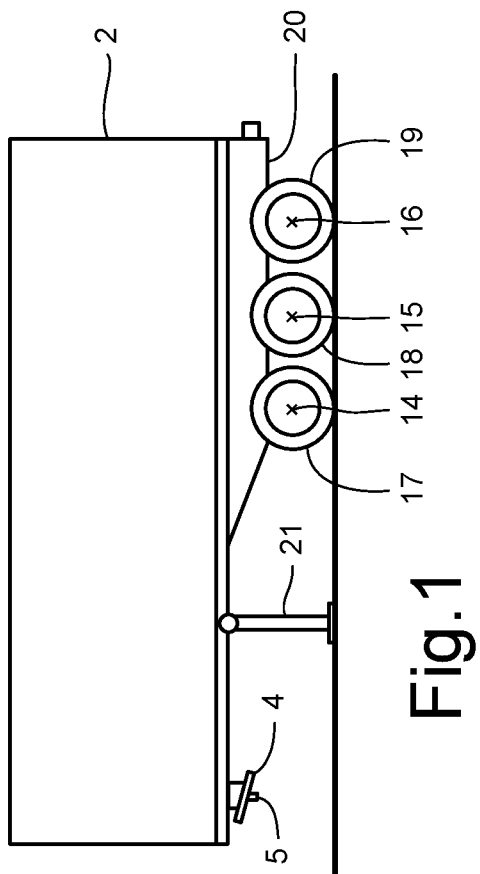
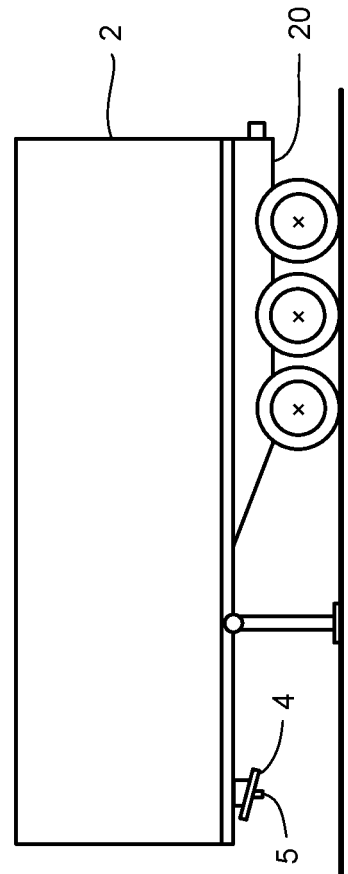
Fig.1
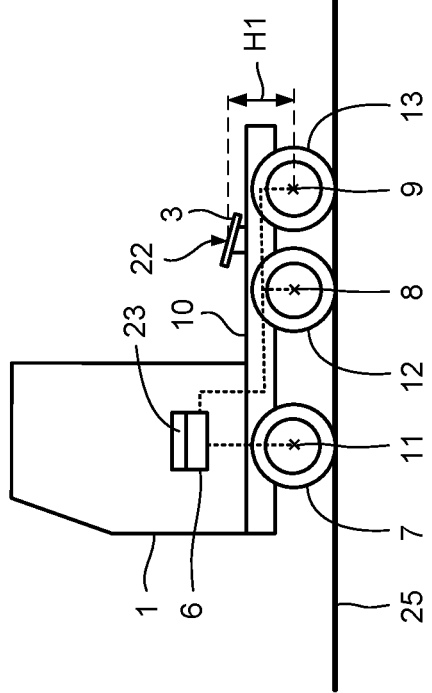
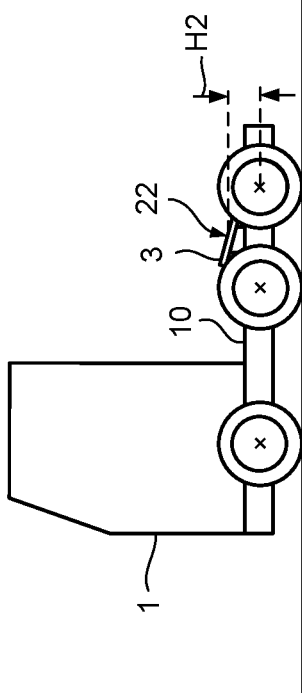
Fig.2

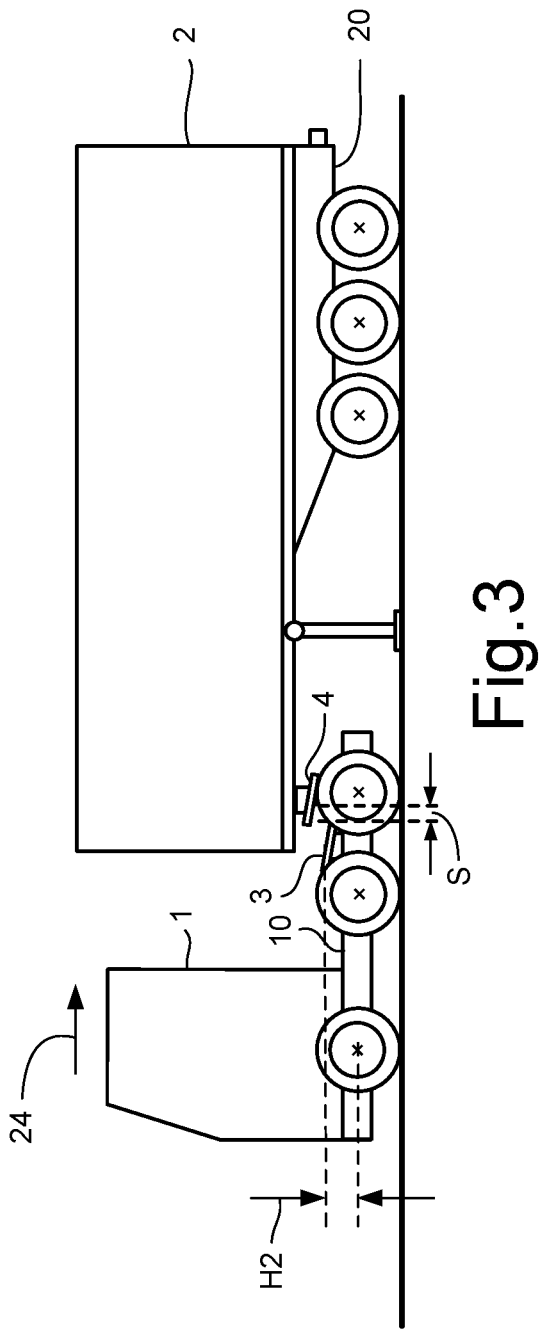
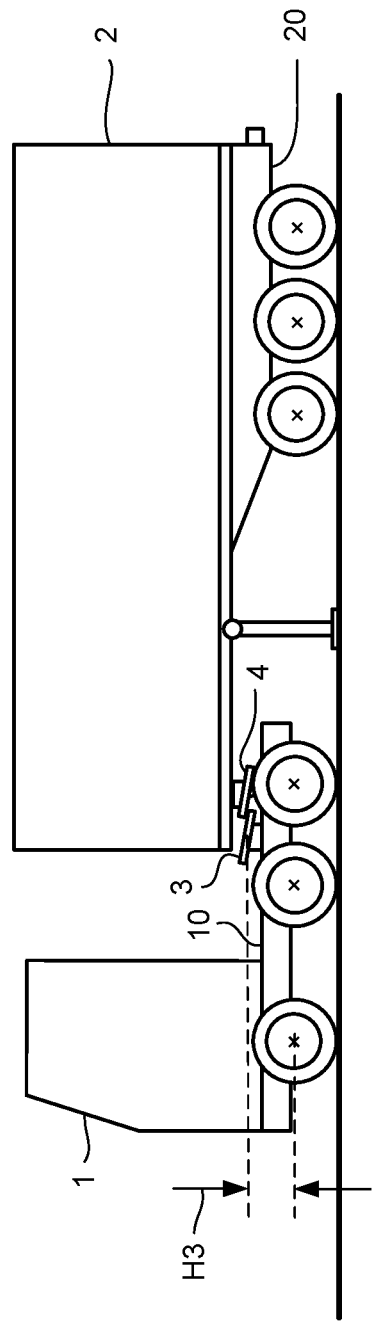

METHOD FOR DETECTING AND/OR CONTROLLING A COUPLING PROCESS BETWEEN A TOWING VEHICLE AND A VEHICLE TRAILER

CROSS REFERENCE TO RELATED APPLICATIONS

This application is a U.S. National Stage Application under 35 U.S.C. § 371 of International Application No. PCT/EP2017/001048 filed on Sep. 5, 2017, and claims benefit to German Patent Application No. DE 10 2016 011 323.5 filed on Sep. 21, 2016. The International Application was published in German on Mar. 29, 2018, as WO 2018/054525 A1 under PCT Article 21(2).

FIELD

The invention relates to a method for controlling a coupling procedure between a towing vehicle and a vehicle trailer that is embodied as a semi-trailer.

BACKGROUND

Methods for controlling a coupling procedure between a towing vehicle and a vehicle trailer are known from DE 10 2006 057 610 A1, DE 10 2014 110 498 A1, EP 1 740 400 B1 and EP 1 874 616 B1.

SUMMARY

In an embodiment, the present invention provides a method for identifying and/or controlling a coupling procedure between a towing vehicle and a vehicle trailer that is embodied as a semi-trailer, wherein the towing vehicle comprises a coupling plate and the semi-trailer comprises a fifth wheel plate having a king pin that is fixed in the coupled state in a locking device of the coupling plate and where the towing vehicle comprises a pneumatic level controlling device by way of which it is possible to set different distances between at least one rear axle of the towing vehicle and the locking device of the coupling plate. The method includes determining a contact between the coupling plate of the towing vehicle and the fifth wheel plate of the semi-trailer by way of a change of an adjusting speed with which a distance between the at least one rear axle of the towing vehicle and the locking device of the coupling plate is increased.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 illustrates a towing vehicle prior to starting a coupling procedure to a semi-trailer;

FIG. 2 illustrates a reduced distance between wheel axles and a locking device;

FIG. 3 illustrates the towing vehicle having been lowered;

FIG. 4 illustrates an increased distance between two rear axles of a towing vehicle and a locking device;

DETAILED DESCRIPTION

Figure 5:
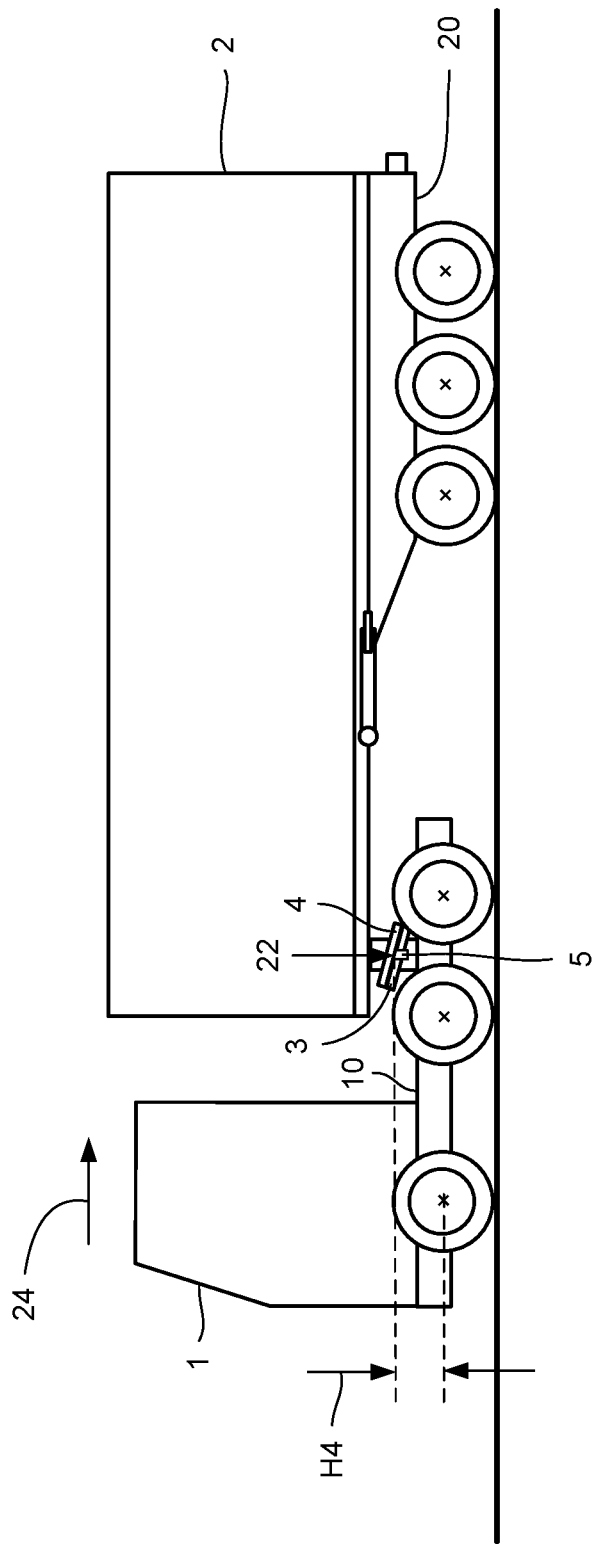
FIG. 5 illustrates an increased distance between at least two rear axles and a locking device.

The prior art is to be further developed by embodiments of the invention, wherein in particular an autonomous coupling procedure or a coupling procedure that is controlled remotely by a person is to be performed as rapidly and smoothly as possible in order to avoid damaging the king pin and/or the coupling plate.

The invention relates to a method for controlling a coupling procedure between a towing vehicle and a vehicle trailer that is embodied as a semi-trailer, wherein the towing vehicle comprises a coupling plate and the semi-trailer comprises a fifth wheel plate having a king pin that is fixed in the coupled state in a locking device of the coupling plate, and where the towing vehicle comprises a pneumatic level controlling device by means of which it is possible to set different distances between the at least one rear axle of the towing vehicle and the locking device of the coupling plate. In the case of such a method, the level of the towing vehicle is lowered prior to making contact with the semi-trailer and is then raised again for the specific coupling procedure.

The invention accordingly relates to a method for identifying and/or controlling a coupling procedure between a towing vehicle and a vehicle trailer that is embodied as a semi-trailer, wherein the towing vehicle comprises a coupling plate and the semi-trailer comprises a fifth wheel plate having a king pin that is fixed in the coupled state in a locking device of the coupling plate and where the towing vehicle comprises a pneumatic level controlling device by means of which it is possible to set different distances between the at least one rear axle of the towing vehicle and the locking device of the coupling plate. In the case of such a method, the level of the towing vehicle is lowered prior to making contact with the semi-trailer and is then raised for the specific coupling procedure.

According to embodiments of the invention, it is provided that the contact between the coupling plate of the towing vehicle and the fifth wheel plate of the semi-trailer is determined by means of a change of the adjusting speed with which the distance between the at least one rear axle of the towing vehicle and the locking device of the coupling plate is increased.

The procedure of identifying such a mechanical resistance when the distance between the at least one rear axle of the towing vehicle and the locking device of the coupling plate is increased, in other words the first contact between the coupling plate of the towing vehicle and the fifth wheel plate of the semi-trailer, may be advantageously determined by means of measuring the adjustment speed or adjusting speed, in particular by means of measuring the change of the adjustment speed with which the distance between the at least one rear axle of the towing vehicle and the locking device of the coupling plate is increased. This adjustment speed may preferably be set by means of determining the adjusting path that is covered over the time. As soon as the adjusting speed suddenly changes, in particular reduces, it is possible to conclude a mechanical contact between the coupling plate and the fifth wheel plate.

A preferred further development of the invention provides that the mentioned distance is reduced from a first distance value H1 to the lowest possible second distance value H2, that the towing vehicle is then driven backward so far toward the semi-trailer until the coupling plate and the fifth wheel plate overlap one another, that the distance from the second distance value H2 to a third distance value H3 is then increased at a constant adjusting speed, where a first contact is determined between the coupling plate and the fifth wheel plate, that the distance to a fourth distance value, H4 is then further increased which ensures a secure connection for the king pin to the locking device of the coupling plate, said connection not damaging the king pin, and that finally the towing vehicle is driven further backward so far toward the semi-trailer until the king pin has reached the locking device of the coupling plate.

It is possible by means of the described multi-stage coupling procedure to perform this coupling procedure very rapidly and very smoothly in comparison to known coupling procedures with the result that damage, in particular to the king pin, may be reliably avoided. A contributing factor to this is that until the first mechanical contact between the coupling plate and the fifth wheel plate is determined, a comparatively high adjustment speed may be used as the chassis of the towing vehicle is raised and that after this first contact for the residual adjustment path, a clearly lower adjusting speed may be used. Moreover, a control device in this regard learns by means of the mentioned first mechanical contact which height the fifth wheel plate of the semi-trailer is actually at in relation to the road level or in relation to the at least one rear axle of the towing vehicle. This height depends not least on how far a strut of the semi-trailer is extended but rather also on whether the base of the strut and/or the wheels of the rear axle of the towing vehicle are in a depression in the ground or on an elevated road surface.

A further development of the proposed method provides the following specific method steps:

a) Reducing the distance between the locking device of the coupling plate and at least one rear axle of the towing vehicle by means of actuating the level controlling device from a first distance value H1 to a second distance value H2, wherein the second distance value H2 ensures that the coupling plate of the towing vehicle may be placed under the fifth wheel plate of the semi-trailer in a contact-free manner.

b) Driving the towing vehicle backward toward the semi-trailer and in this case placing the coupling plate below the fifth wheel plate one above the other in such a manner that the king pin maintains a predetermined safe distance from the coupling plate.

c) Increasing the distance between the locking device of the coupling plate and the at least one rear axle of the towing vehicle by means of actuating the level controlling device from the second distance value H2 to a third distance value H3 at which a mechanical contact between the coupling plate and the fifth wheel plate is determined.

d) Determining the third distance value H3 between the at least one rear axle of the towing vehicle and the locking device of the coupling plate in this first contact position.

e) Further increasing the distance between the at least one rear axle of the towing vehicle and the locking device of the coupling plate by means of again actuating the level controlling device to a fourth distance value H4 after which it is ensured that the coupling plate and also the king pin are securely connected to the fifth wheel plate in a manner that does not cause any damage.

f) Driving the towing vehicle further backward toward the semi-trailer until the king pin has reached the locking device of the coupling plate.

Furthermore, it may be provided that the towing vehicle is driven at least so far backward toward the semi-trailer that the fifth wheel plate grips so far over the edge of the coupling plate, that a transmission of force may take place between the coupling plate and the fifth wheel plate. Accordingly, a large overlap between the coupling plate and the fifth wheel plate is not necessary; it suffices if only a small overlapping region exists that allows the control device of the level controlling device of the towing vehicle to identify that a mechanical resistance is present in the adjusting direction.

The adjusting speed is preferably determined whilst air springs of the level controlling device are being filled with a constant compressed air volume flow at the at least one rear axle of the towing vehicle. In so doing, it is possible to start from a constant adjusting speed at the latest after an initial positive accelerating phase. If this adjusting speed reduces, as a consequence a mechanical contact between the coupling plate and the fifth wheel plate is concluded.

The adjusting speed is preferably higher during the first increase in distance H2/H3 than during the last increase in distance H3/H4 with the result that the first adjustment path until the first mechanical contact between the coupling plate and the fifth wheel plate is overcome comparatively rapidly, whilst the last smaller adjustment path is covered comparatively slowly and smoothly.

The mentioned method may be implemented autonomously in a controlled manner by means of a control device. In this case, the towing vehicle is controlled by means of the control device alone both with regard to the shunting action of said towing vehicle as well as with regard to the lowering and then the raising of the drive frame of said towing vehicle. However, it is also possible that the proposed method may be implemented remotely by means of a person who is in the towing vehicle or outside the towing vehicle.

The invention is further explained below with reference to an exemplary embodiment that is illustrated in the drawing. In the drawing, the FIGS. 1 to 5 illustrate a towing vehicle and a vehicle trailer that is embodied as a semi-trailer in different control situations in which a decoupling procedure is performed using the method in accordance with the invention. FIG. 6 illustrates a path-time diagram in which the change of the distance between the two rear axles and the locking device of the coupling plate of the towing vehicle is illustrated whilst the method is being implemented in accordance with the invention.

Accordingly, FIGS. 1 to 5 illustrate a towing vehicle 1 that comprises a front axle 11 and two rear axles 8, 9, to which pneumatic-tired wheels 7, 12, 13 are fastened in such a manner as to be able to rotate. The towing vehicle 1 comprises a chassis 10 or vehicle frame that is supported by the vehicle axles 8, 9, 11 and comprises a construction having a driver cabin that is not further referred to and a coupling device for coupling a trailer vehicle that is embodied as a semi-trailer 2. The coupling device comprises a coupling plate 3 that is illustrated in a simplified manner and that comprises a locking device 22. This locking device 22 receives a king pin 5 for coupling the semi-trailer 2 to the towing vehicle 1, said king pin being fastened to a fifth wheel plate 4 and pointing in the direction of the road surface 25, wherein the fifth wheel plate 4 is fastened to the frame 20 of the semi-trailer 2.

The frame 20 of the semi-trailer 2 is supported by three axles 14, 15, 16, to which in each case two pneumatic-tired wheels 17, 18, 19 are fastened in such a manner as to be able to rotate. The semi-trailer 2 moreover comprises a strut 21 that is fastened in a pivotable manner to the frame 20 of said semi-trailer, it being possible to adjust said strut in its length and to place said strut down on the road surface 25 using a strut base. This strut 21 in the parked state of the semi-trailer 2 supports a part of the load of said semi-trailer near the region in which the fifth wheel plate 5 is arranged.

The towing vehicle 1 comprises a pneumatic level controlling device 6 comprising as known a control device 23, a pressure generating device, a pressure storage device, pressure lines that lead to the wheel axles 8, 9, 11 and air springs that are arranged on the wheel axles 8, 9, 11 are associated with said level controlling device. Since such a level controlling device 6 is also known from the prior art mentioned in the introduction, a more detailed illustration and description of the components of said level controlling device are omitted here. The distance of the wheel axles 8, 9, 11 in relation to the chassis 10 or to the locking device 22 on the coupling plate 3 of the towing vehicle 1 may be adjusted by means of this level controlling device 6, said locking device being rigidly connected to said chassis.

FIG. 1 illustrates the towing vehicle 1 prior to starting a coupling procedure to the semi-trailer 2, said coupling procedure being performed in accordance with the invention. In this case, the towing vehicle 1 is in its normal driving configuration in which the distance between the wheel axles 8, 9, 11 and the locking device 22 comprises a first distance value H1 that may be the largest distance value that is to be set.

At the start of the control method in accordance with the invention, in accordance with FIG. 2 the distance between the wheel axles 8, 9, 11 and the locking device 22 is reduced to a second distance value H2 that in this exemplary embodiment is the lowest distance value H2 that is to be set. This second distance value H2 is in any case so low that the towing vehicle 1 may drive below the end of the semi-trailer 2 near to the strut without the coupling plate 3 of said towing vehicle and the fifth wheel plate 4 coming into contact with one another.

FIG. 3 illustrates this situation in which the towing vehicle 1 is autonomously lowered to the second distance value H2 or is driven in a controlled manner by a driver in the reversing direction 24 under the semi-trailer 2 and has stopped at that location. It is apparent that the coupling plate 3 and the fifth wheel plate 4 in this case have still not come into contact with one another. The towing vehicle 1 is only driven so far under the semi-trailer 2 that the overlap between the coupling plate 3 and the fifth wheel plate 4 is so large that the king pin 5 is at a sufficiently large safe distance S from the coupling plate 3. This safe distance S in the case of the conventional coupling devices in relation to this is approximately 0.7 meters. By maintaining the safe distance S, it is ensured that the king pin 5 never collides with the coupling plate 3 as the towing vehicle 1 is driven backward to the semi-trailer 2.

As illustrated in FIG. 4, the level controlling device 6 is subsequently actuated again in order to increase the distance at least between the two rear axles 8, 9 of the towing vehicle 1 and the locking device 22 of the coupling plate 3 to a third distance value H3. In this case, the coupling plate 3 comes into contact with the fifth wheel plate 4 without in this case making contact with the king pin 5. As soon as a mechanical contact between the coupling plate 3 and the fifth wheel plate 4 has been determined by the control device 23, the adjustment procedure is temporarily terminated.

The procedure of determining the first mechanical contact between the coupling plate 3 and the fifth wheel plate 4 is performed preferably by means of measuring the adjusting speed v as the distance between at least the two rear axles 8, 9 and the locking device 22 of the coupling plate 3 is increasing. This adjusting speed v may be determined in a comparatively simple manner by means of measuring the adjusting path between at least the two rear axles 8, 9 and the locking device 22 over the time t. Obviously, the adjusting path may also be measured over other distances, perhaps by means of the distance between a rear axle 8, 9 of the towing vehicle 1 and its chassis 10. If the adjusting speed v that is determined in this manner reduces as the distance from the two rear axles 8, 9 to the locking device 22 of the coupling plate 3 is increasing, it is possible to conclude that a mechanical contact has been made between the coupling plate 3 and the fifth wheel plate 4 with the result that the increase in the described distance is initially interrupted.

Figure 6:
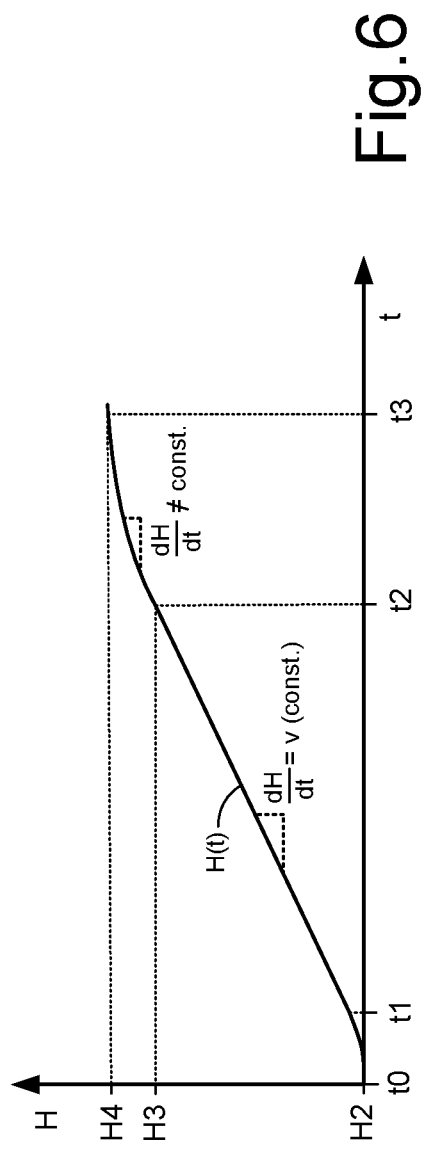
FIG. 6 illustrates a path-time diagram of a control procedure.

In order to complete the procedure of coupling the semi-trailer 2 to the towing vehicle 1, the distance between at least the two rear axles 8, 9 and the locking device 22 of the coupling plate 3 is increased, as is illustrated in FIG. 5, to such a fourth distance value H4 after which it is ensured that the coupling plate 3 and the king pin 5 on the fifth wheel plate 4 are connected securely and in a manner that does not cause any damage.

Finally, the towing vehicle 1 is again moved in the backward direction 24 and in fact only so far until the king pin 5 reaches the locking device 22 of the coupling plate 3 and is locked at that location by means of a locking mechanism. The strut 21 of the semi-trailer may finally be pivoted upward, as a result of which the tandem of the towing vehicle 1 and the semi-trailer 2 is ready to be driven away.

FIG. 6 illustrates in a path-time diagram the above-described control procedure as the distance between at least the two rear axles 8, 9 of the towing vehicle 1 and the locking device 22 of the coupling plate 3 for coupling said vehicle to the semi-trailer 2 is increasing. At the point in time t=0 the distance between the wheel axles 8, 9 and the locking device 22 of the towing vehicle 1 is the lowest distance value H2. After the point in time t0, the air springs of the towing vehicle 1 are filled with a constant volume flow of compressed air in order to achieve the greatest distance value H4 at which a secure connection between the towing vehicle 1 and the semi-trailer 2 is possible. In the short period of time t=0 to t1 in which the compressed air springs are pre-filled, the increase in distance is initially not linear, which is clearly apparent in the diagram. Afterward, in the period of time t1 to t2, the distance H2/H3 between the wheel axles 8, 9 and the locking device 22 of the towing vehicle 1 conversely increases at a constant adjusting speed v on account of the constant volume flow of compressed air.

As soon as the coupling plate 3 of the towing vehicle 1 comes into mechanical contact with the fifth wheel plate 3 of the semi-trailer 2, the adjusting speed v reduces in a manner that may be measured. The adjusting speed v is measured preferably by means of an adjusting path sensor, the distance measured values of said adjusting path sensor being set in relation to the period of time which has respectively elapsed since the last distance measurement. The third distance value H3 that is achieved during the mentioned contact is ascertained by the control device 23 of the level controlling device 24 and from this the further adjusting path H3/H4 that is still to be covered until achieving the fourth distance value H4 is determined, a secure connection of the king pin 5 of the semi-trailer 2 to the locking device 22 of the coupling plate 3 of the towing vehicle 1 being possible at said fourth distance value. The last path distance from the third distance value H3 to the fourth distance value H4 is then covered at a comparatively low adjusting speed v with the result that in this last region where the towing vehicle 1 is raised, the towing vehicle 1 and the semi-trailer 2 are coupled in a smooth manner that does not cause any damage.

The method in accordance with the invention may also be used for a coupling procedure between a motor vehicle and a full trailer, in which the coupling devices are in fact embodied in a different manner though the control functions may be performed as described.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 Towing vehicle, truck, motor vehicle
2 Semi-trailer
3 Coupling plate of the towing vehicle
4 Fifth wheel plate of the semi-trailer
5 King pin of the semi-trailer
6 Level controlling device
7 Front axle of the towing vehicle
8 First rear axle of the towing vehicle
9 Second rear axle of the towing vehicle
10 Chassis of the towing vehicle
11 Front wheel of the towing vehicle
12 First wheel of the rear axle of the towing vehicle
13 Second wheel of the rear axle of the towing vehicle
14 First axle of the semi-trailer
15 Second axle of the semi-trailer
16 Third axle of the semi-trailer
17 First wheel of the semi-trailer
18 Second wheel of the semi-trailer
19 Third wheel of the semi-trailer
20 Frame of the semi-trailer
21 Strut of the semi-trailer
22 Locking device of the coupling plate
23 Control device of the level controlling device
24 Reversing direction
25 Road surface
H Distance between the rear axle of the towing vehicle and the locking device of the coupling plate of the semi-trailer
H1 First distance value (normal driving height)
H2 Second distance value (lowest driving height)
H3 Third distance value (contact height)
v Adjusting speed

The invention claimed is:

1. A method for identifying and/or controlling a coupling procedure between a towing vehicle including a coupling plate and a semi-trailer including a fifth wheel plate having a king pin, the method comprising:
increasing, using a pneumatic level controlling device of the towing vehicle, a distance between a rear axle of the towing vehicle and the coupling plate; and
during the increasing, determining a first contact between the coupling plate of the towing vehicle and the fifth wheel plate of the semi-trailer by detecting a change in a measured adjusting speed with which the distance between the rear axle of the towing vehicle and the coupling plate is increased.

2. The method as claimed in claim 1, further comprising:
initially decreasing the distance between the rear axle of the towing vehicle and the coupling plate of the towing vehicle from a first distance value to a lowest possible second distance value; and
wherein driving the towing vehicle is then driven backward toward the semi-trailer until the coupling plate and the fifth wheel plate overlap one another,
wherein the increasing the distance between the rear axle of the towing vehicle and the coupling plate of the towing vehicle is performed with the coupling plate and the fifth wheel plate overlapping one another and includes:
  increasing, at a constant adjusting speed from the second distance value to a third distance value at which the first contact is determined, the distance between the rear axle of the towing vehicle, and
  subsequently increasing, from the third distance value to a fourth distance value at which a secure connection for the king pin to the locking device of the coupling plate can be established without damaging the king pin, and
wherein the method further comprises, after the fourth distance value has been reached, driving the towing vehicle backward toward the semi-trailer until the king pin reaches the locking device of the coupling plate.

3. The method as claimed in claim 1, further comprising:
reducing, from a first distance value to a second distance value, the distance between the rear axle of the towing vehicle and the coupling plate by actuating the pneumatic level controlling device, wherein the second distance value corresponds to a distance between the rear axle of the towing vehicle and the coupling plate that ensures that the coupling plate can be placed under the fifth wheel plate of the semi-trailer in a contact-free manner; and
driving the towing vehicle backward toward the semi-trailer and placing the coupling plate below the fifth wheel plate in such a manner that the king pin maintains a predetermined safe distance from the coupling plate,
wherein the increasing the distance between the rear axle of the towing vehicle and the coupling plate include actuating the level controlling device to increase, from the second distance value to a third distance value at which the first contact is determined, the distance between the rear axle of the towing vehicle and the coupling plate wherein the increasing the distance between the rear axle of the towing vehicle and the coupling plate further includes actuating the level controlling device to increase, from the third distance value to a fourth distance value at which the coupling plate and the king pin are configured to be securely connected in a manner that does not cause any damage, and wherein the method further comprises, after the fourth distance value has been reached, driving the towing vehicle further backward toward the semi-trailer until the king pin has reached the locking device of the coupling plate.

4. The method as claimed in claim 1, wherein the towing vehicle is driven backward toward the semi-trailer such that the fifth wheel plate grips over the edge of the coupling plate to an extent that a transmission of force can take place between the coupling plate and the fifth wheel plate.

5. The method as claimed in claim 1, wherein the adjusting speed is measured while air springs of the level controlling device are filled with a constant compressed air volume flow at the rear axle.

6. The method as claimed in claim 5, wherein the increasing the distance between the rear axle of the towing vehicle and the coupling plate of the towing vehicle includes varying an adjusting speed with which the distance between the rear axle of the towing vehicle and the coupling plate is increased, wherein the varying the adjusting speed is carried out such that the adjusting speed during an increase from a low distance value to an intermediate distance value is greater than the adjusting speed during an increase from the intermediate value to a high distance value, and wherein the intermediate distance value corresponds to the first contact between the coupling plate of the towing vehicle and the fifth wheel plate of the semi-trailer with the result that a first adjustment path from the low distance value to the first mechanical contact between the coupling plate and the fifth wheel plate is traversed at a greater adjusting speed than is a final adjustment path from the first mechanical contact to a final position of the coupling plate.

7. The method as claimed in claim 1, wherein the method is implemented autonomously in a controlled manner by a control device.

8. The method according to claim 7, the method further comprising:

prior to the increasing the distance between the rear axle of the towing vehicle and the coupling plate, autonomously driving the towing vehicle backward toward the semi-trailer until the coupling plate and the fifth wheel plate overlap one another; and after the fourth distance value has been reached, autonomously driving the towing vehicle backward toward the semi-trailer until the king pin reaches the locking device of the coupling plate.

9. The method as claimed in claim 1, wherein the method is implemented remotely by a person who is in the towing vehicle or outside the towing vehicle.

10. The method according to claim 1, wherein the increasing the distance between the rear axle of the towing vehicle and the coupling plate includes:

increasing, at a constant adjusting speed from the second distance value to a third distance value at which the first contact is determined, the distance between the rear axle of the towing vehicle, and subsequently increasing the distance between the rear axle of the towing vehicle and the coupling plate from the third distance value to a fourth distance value at which a secure connection for the king pin to the locking device of the coupling plate can be established without damaging the king pin.

11. The method according to claim 10, wherein the subsequently increasing the distance between the rear axle of the towing vehicle and the coupling plate from the third distance value to the fourth distance value is performed at a variable speed.

12. The method according to claim 11, wherein the variable speed is a speed that is a decreasing function of time.

13. The method according to claim 1, wherein the king pin of the fifth wheel plate of the semi-trailer is configured to be, in a coupled state, fixed in a locking device of the coupling plate of the towing vehicle.

14. A level controlling device of a towing vehicle, comprising:

a control device configured to:

increase a distance between a rear axle of the towing vehicle and a coupling plate of the towing vehicle, the coupling plate of the towing vehicle including a locking device; and during the increasing, determining a first contact between the coupling plate and a fifth wheel plate of a semi-trailer by detecting a change in a measured adjusting speed with which the distance between the rear axle of the towing vehicle and the coupling plate is increased.

15. The level controlling device according to claim 14, wherein the control device is configured to increase the distance between the rear axle of the towing vehicle and the coupling plate by:

increasing, at a constant adjusting speed from the second distance value to a third distance value at which the first contact is determined, the distance between the rear axle of the towing vehicle, and subsequently increasing the distance between the rear axle of the towing vehicle and the coupling plate from the third distance value to a fourth distance value at which a secure connection for the king pin to the locking device of the coupling plate can be established without damaging the king pin.

16. The level controlling device according to claim 15, wherein the control device is configured to perform the subsequently increasing, of the distance between the rear axle of the towing vehicle and the coupling plate from the third distance value to the fourth distance value, at a variable speed.

17. The level controlling device according to claim 16, wherein the variable speed is a speed that is a decreasing function of time.

18. The level controlling device according to claim 14, wherein the fifth wheel plate of the semi-trailer includes a king pin configured to be, in a coupled state, fixed in a locking device of the coupling plate of the towing vehicle.

19. A towing vehicle for towing a semi-trailer, the towing vehicle comprising a level controlling device comprising a control device configured to:

increase a distance between a rear axle of the towing vehicle and a coupling plate of the towing vehicle, the coupling plate of the towing vehicle including a locking device; and during the increasing, determining a first contact between the coupling plate and a fifth wheel plate of a semi-trailer by detecting a change in a measured adjusting speed with which the distance between the rear axle of the towing vehicle and the coupling plate is increased.

* * * * *